(12) United States Patent
Sano (10) Patent No.: US 8,594,743 B2
(45) Date of Patent: Nov. 26, 2013

(54) PORTABLE TERMINAL, AUDIO OUTPUT CONTROL METHOD, AND AUDIO OUTPUT CONTROL PROGRAM

(75) Inventor: Motonori Sano, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 291 days.

(21) Appl. No.: 12/571,655

(22) Filed: Oct. 1, 2009

(65) Prior Publication Data

US 2010/0124947 A1 May 20, 2010

(30) Foreign Application Priority Data

Nov. 14, 2008 (JP) ................. 2008-292214

(51) Int. Cl.
*H04M 1/00* (2006.01)
*H04R 1/10* (2006.01)
*H04R 3/00* (2006.01)

(52) U.S. Cl.
USPC ............. 455/569.1; 381/74; 381/85; 381/111

(58) Field of Classification Search
USPC .................................... 455/556.1, 575, 404.1
See application file for complete search history.

(56) References Cited

U.S. PATENT DOCUMENTS

| 2002/0039424 | A1* | 4/2002 | Watanuki ...................... 381/74 |
| 2003/0235165 | A1* | 12/2003 | Wang ............................ 370/331 |
| 2006/0252457 | A1 | 11/2006 | Schrager |
| 2008/0031475 | A1* | 2/2008 | Goldstein ..................... 381/151 |
| 2008/0152160 | A1* | 6/2008 | Chew et al. .................. 381/71.6 |
| 2008/0200159 | A1 | 8/2008 | Lai |
| 2009/0023417 | A1* | 1/2009 | Davis et al. .................. 455/403 |
| 2010/0105331 | A1* | 4/2010 | Buehler et al. ............... 455/41.3 |

FOREIGN PATENT DOCUMENTS

| CN | 1325250 | 12/2001 |
| CN | 1495070 | 5/2004 |
| CN | 1856182 | 11/2006 |
| EP | 1 950 935 | 7/2008 |
| EP | 2 073 513 A2 | 6/2009 |
| JP | 9-247249 | 9/1997 |
| JP | 2002-112383 | 4/2002 |
| JP | 2004-289604 | 10/2004 |
| JP | 3573998 | 10/2004 |

(Continued)

OTHER PUBLICATIONS

Office Action issued Jul. 2, 2012, in Chinese Patent Application No. 200910221762.3 (with English-language Translation).

(Continued)

*Primary Examiner* — George Eng
*Assistant Examiner* — Joseph Dean, Jr.
(74) *Attorney, Agent, or Firm* — Oblon, Spivak, McClelland, Maier & Neustadt, L.L.P.

(57) ABSTRACT

A portable terminal includes an audio output unit configured to output audio signals to a plurality of external headphones; an event occurrence detection unit configured to detect occurrence of a predetermined event; and a control unit configured to, when the event occurrence detection unit detects the occurrence of the predetermined event while the audio output unit is outputting the audio signals to the plurality of external headphones, control the audio output unit to at least reduce the volume of an audio signal output to a particular external headphone specified in advance from among the plurality of external headphones to which the audio signals are output.

13 Claims, 8 Drawing Sheets

(56) References Cited

FOREIGN PATENT DOCUMENTS

| JP | 2005-143051 A | 6/2005 |
| JP | 2007-97007 | 4/2007 |
| JP | 2008-227717 | 9/2008 |
| WO | WO 2008/070005 A2 | 6/2008 |
| WO | WO 2008/070005 A3 | 6/2008 |

OTHER PUBLICATIONS

Office Action issued Aug. 1, 2012, in Japanese Patent Application No. 2008-292214.

Combined Chinese Office Action and Search Report Issued Feb. 4, 2013 in Patent Application No. 200910221762.3 (with English translation of Categories of Cited Documents).

Search Report issued Mar. 12, 2013 in European Application No. 09174369.0.

Office Action issued Jun. 5, 2013 in Chinese Patent Application No. 200910221762.3.

* cited by examiner

| | OUTPUT TO HEADPHONE SPECIFIED IN ADVANCE (MAIN HEADPHONE) | OUTPUT TO HEADPHONE NOT SPECIFIED IN ADVANCE (SUB-HEADPHONE) |
|---|---|---|
| WHILE MUSIC IS BEING PLAYED BACK (FIRST EXAMPLE) | MUSIC | MUSIC |
| WHILE VIDEO IS BEING PLAYED BACK (SECOND EXAMPLE) | VIDEO SOUND | VIDEO SOUND |
| WHEN INCOMING CALL HAS ARRIVED WHILE MUSIC OR VIDEO IS BEING PLAYED BACK (THIRD EXAMPLE) | RINGTONE | MUSIC/VIDEO SOUND |
| WHEN CALL IS ANSWERED HANDS-FREE WHILE MUSIC OR VIDEO IS BEING PLAYED BACK (FOURTH EXAMPLE) | VOICE OF CALLER | MUSIC/VIDEO SOUND |
| WHEN CALL IS ANSWERED HANDS-FREE WHILE MUSIC OR VIDEO IS BEING PLAYED BACK (FIFTH EXAMPLE) | VOICE OF CALLER | VOICE OF CALLER |
| WHEN CALL IS ANSWERED USING CELLULAR PHONE TERMINAL MAIN BODY WHILE MUSIC OR VIDEO IS BEING PLAYED BACK (SIXTH EXAMPLE) | NONE | NONE |
| WHEN TRAIN ON WHICH USER IS RIDING HAS APPROACHED NEAR STATION WHILE MUSIC OR VIDEO IS BEING PLAYED BACK (SEVENTH EXAMPLE) | REDUCE VOLUME OF MUSIC/VIDEO SOUND SO THAT USER CAN CATCH ANNOUNCEMENT | MUSIC/VIDEO SOUND |
| WHEN ALARM SET IN CELLULAR PHONE TERMINAL HAS OPERATED WHILE MUSIC OR VIDEO IS BEING PLAYED BACK (EIGHTH EXAMPLE) | ALARM SOUND | MUSIC/VIDEO SOUND |
| WHEN INCOMING MAIL HAS ARRIVED WHILE MUSIC OR VIDEO IS BEING PLAYED BACK (NINTH EXAMPLE) | READ VOICE OF SUBJECT AND TEXT OF MAIL | MUSIC/VIDEO SOUND |
| WHEN EARTHQUAKE EARLY WARNING HAS BEEN RECEIVED WHILE MUSIC OR VIDEO IS BEING PLAYED BACK (TENTH EXAMPLE) | EARTHQUAKE EARLY WARNING SOUND | EARTHQUAKE EARLY WARNING SOUND |

PORTABLE TERMINAL, AUDIO OUTPUT CONTROL METHOD, AND AUDIO OUTPUT CONTROL PROGRAM

BACKGROUND OF THE INVENTION

1. Field of the Invention

The present invention relates to a portable terminal, such as a cellular phone terminal, that is capable of outputting audio signals of music, videos, and the like to a plurality of external headphones, an audio output control method for controlling audio output to the plurality of external headphones, and an audio output control program.

2. Description of the Related Art

Headphone connectors of cellular phone terminals have been used, for example, only for so-called "hands-free" voice calls. However, since recent cellular phone terminals have a function of playing back music and videos, an increased number of people have come to use the above-mentioned headphone connectors in order to listen to music and video sounds.

It is assumed that listening to music or video sounds by using a headphone is performed by only a single user. Thus, for example, it is difficult for a plurality of people to enjoy listening to music or video sounds by using a single cellular phone terminal.

When music or video sounds are output via a loudspeaker provided in a cellular phone terminal, it is possible for many people to listen to the music or video sounds. However, in a case where the place where people listen to music or video sounds is, for example, a public space, outputting such sounds via the loudspeaker may trouble surrounding people.

Under such circumstances, a technique in which by providing a plurality of headphone connection terminals in a portable audio device and connecting headphones to the respective headphone connection terminals, a plurality of people are able to listen to music at the same time, has been proposed, for example, in Japanese Unexamined Patent Application Publication No. 2007-97007.

In addition, a cellular phone including two earphone jacks having an input/output function is disclosed, for example, in Japanese Unexamined Patent Application Publication No. 9-247249 (FIG. 1). In the cellular phone, an externally input audio signal that has been input from an external audio output device to one of the two earphone jacks can be switched to an audio signal output from an internal audio processing circuit and can be output to the other one of the two earphone jacks. That is, in a case where a call has arrived at the cellular phone while an externally input audio signal input from an audio output device to one of the earphone jacks is being output via the other one of the earphone jacks, the cellular phone switches the externally input audio signal to a ringing signal and outputs the ringing signal via the other one of the earphone jacks.

SUMMARY OF THE INVENTION

In a case where headphones are connected to a plurality of headphone terminals provided in a cellular phone terminal so that audio signals of music or videos can be output to the respective headphones as described, for example, in Japanese Unexamined Patent Application Publication No. 2007-97007, the problems described below may occur.

For example, in a case where an incoming voice call or an incoming mail has arrived while a plurality of people are listening to music or video sounds being played back by a cellular phone terminal, the ringtone is output to all the headphones, thus preventing them from listening to music or video sounds. In contrast, in a case where, for example, the ringtone of an incoming call or mail is not output, no response can be made to the incoming call or mail. In particular, in a case where an incoming call has arrived, a user of the cellular phone terminal is not able to answer the incoming call. In addition, in a case where an incoming mail has arrived, it may be difficult for the user of the cellular phone terminal to realize the arrival of the incoming mail immediately.

For example, in the technique described in Japanese Unexamined Patent Application Publication No. 9-247249, when a call has arrived, an externally input audio signal is switched to a ringing signal and is output. With this technique, an externally input audio signal that has been input from an audio output device to one of earphone jacks can be output via the other one of earphone jacks. However, this technique is not usable for a case where, for example, a plurality of people listen to music or video sounds.

It is desirable to provide a portable terminal, such as a cellular phone terminal, that is capable of outputting audio signals to a plurality of external headphones, in which even if an incoming call or the like has arrived, a plurality of people are less likely to be prevented from listening to music or video sounds and a user of the portable terminal is able to appropriately respond to the incoming call or the like, to an audio output control method, and to an audio output control program.

According to an embodiment of the present invention, when an event occurrence detection unit detects occurrence of a predetermined event while an audio output unit configured to output audio signals to a plurality of external headphones is outputting the audio signals to the plurality of external headphones, a control unit performs control for at least reducing the volume of an audio signal output to a particular external headphone specified in advance from among the plurality of external headphones to which the audio signals are output.

That is, according to an embodiment of the present invention, in a case where, for example, a predetermined event such as arrival of an incoming call has occurred while audio signals are being output to a plurality of external headphones, for example, the volume of only an audio signal output to a particular external headphone being used by a user of a portable terminal is at least reduced. Thus, the user of the portable terminal is able to understand that some event has occurred. Meanwhile, since an audio signal is continued to be output to an external headphone different from the particular external headphone, a user of the external headphone different from the particular external headphone is able to continue to listen to a sound output to the headphone.

According to an embodiment of the present invention, by reducing the volume of only an audio signal output to a particular external headphone in a case where, for example, a predetermined event such as arrival of an incoming call has occurred while audio signals are being output to a plurality of external headphones, a user of the particular external headphone is able to appropriately respond to the occurrence of the predetermined event. Furthermore, according to an embodiment of the present invention, since the volume of only an audio signal output to a particular external headphone is reduced in a case where a predetermined event such as arrival of an incoming call has occurred, a user of an external headphone different from the particular external headphone is able to continue to listen to an audio signal of, for example, music or videos, regardless of the occurrence of the predetermined event.

DESCRIPTION OF THE PREFERRED EMBODIMENTS

An embodiment of the present invention will be described with reference to the drawings.

In the embodiment described below, a cellular phone terminal that is capable of outputting audio signals of music or videos to a plurality of external headphones, and an audio output control method and an audio output control program for controlling audio output to the plurality of external headphones in the cellular phone terminal will be described as application examples. The details described in the embodiment are merely examples, and the present invention is not limited to these examples.

Figure 1:
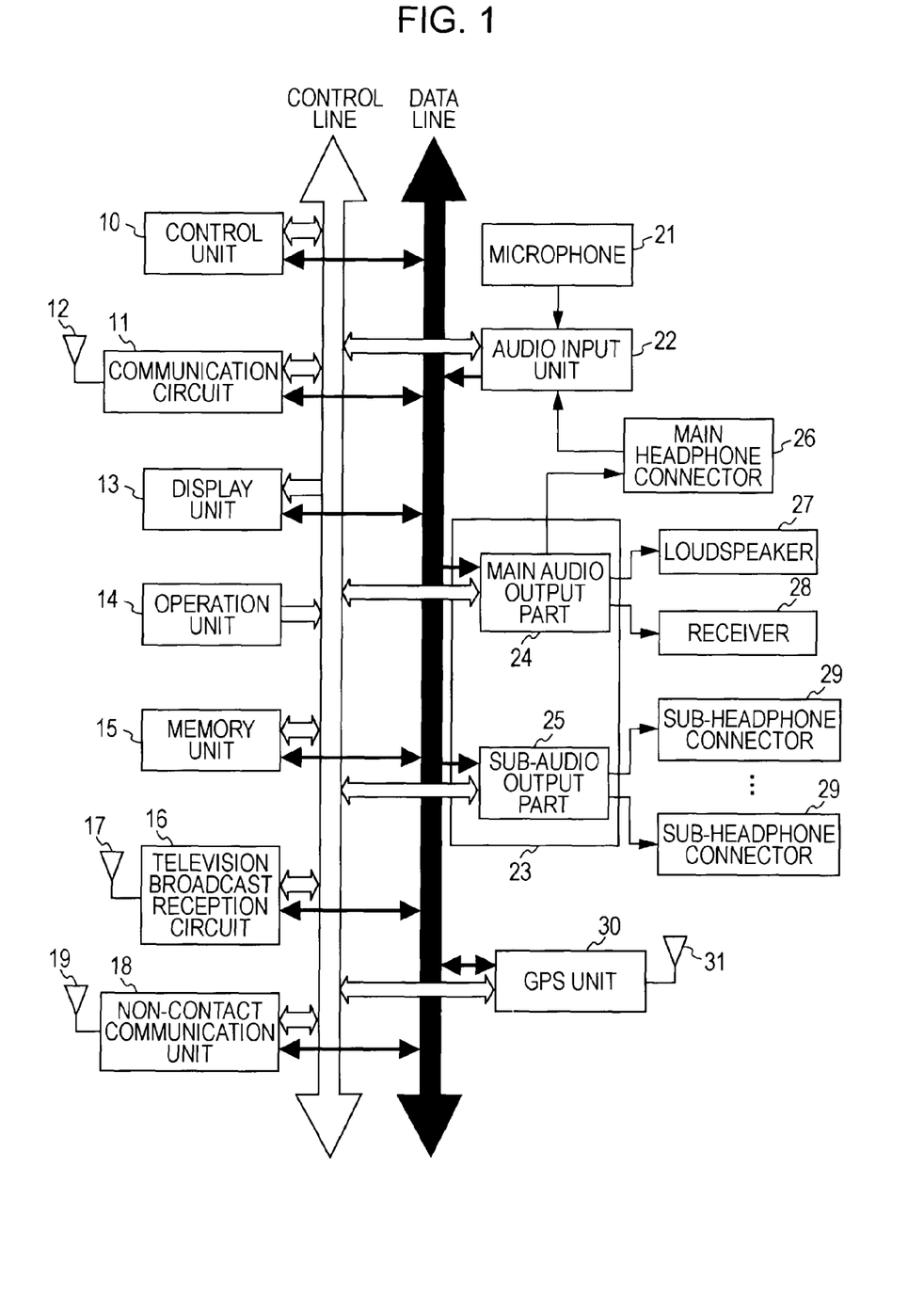
FIG. 1 is a block diagram schematically showing the internal circuit configuration of a cellular phone terminal according to a first embodiment of the present invention.

Schematic Internal Configuration of Cellular Phone Terminal According to First Embodiment FIG. 1 schematically shows the internal configuration of a cellular phone terminal according to a first embodiment of the present invention.

Referring to FIG. 1, a communication antenna 12, which is, for example, a built-in antenna, performs transmission and reception of signal waves for calls or packet communications. A communication circuit 11 performs frequency conversion, modulation, demodulation, and the like of transmission/reception signals.

A display unit 13 includes, for example, a display device, such as a liquid crystal display device or an organic electroluminescent (EL) display device, and a display driving circuit for the display device. For example, various types of text and messages, such as electronic mails, images and video images acquired through the Internet, television images received at a television broadcast reception circuit 16, which will be described latter, video images obtained by playing back video images stored in a memory unit 15, and the like are displayed on the display device of the display unit 13.

An operation unit 14 includes various keys, such as numeric keys, a call origination key, and an end/power key, and various operators, such as arrow keys and a jog dial, which are provided on the casing of the cellular phone terminal, which is not illustrated, and an operation signal generator for generating operation signals when they are operated.

The television broadcast reception circuit 16 includes a television broadcast reception tuner. The television broadcast reception circuit 16 receives a television broadcast signal via a television broadcast reception antenna 17. A television broadcast video signal received by the television broadcast reception circuit 16 is transmitted to the display unit 13 under the control of a control unit 10, and is displayed on the display device of the display unit 13. A television broadcast audio signal received by the television broadcast reception circuit 16 is transmitted to an audio output unit 23, which will be described later, under the control of the control unit 10, and is transmitted to a main headphone connector 26 or a sub-headphone connector 29, which will be described later, or output as a sound via a loudspeaker 27.

A global positioning system (GPS) unit 30 receives radio waves from a GPS satellite via a GPS antenna 31 to obtain the current position, moving speed, moving distance, and the like of the cellular phone terminal. Data of the current position, moving speed, moving distance, and the like obtained by the GPS unit 30 is supplied through a data line to the control unit 10, where necessary.

A non-contact communication unit 18 is a circuit for performing information communication in a non-contact state caused by, for example, electromagnetic induction, via a non-contact communication antenna 19. The cellular phone terminal according to this embodiment performs, through non-contact communication using the non-contact communication unit 18, transmission and reception of so-called "electronic money" information, information on getting in and out of public transport such as trains and buses, information on entering and exiting from stations, ticket information used for commuter passes, control information on entering and leaving from companies and schools, and the like.

A microphone 21 is provided in the casing of the cellular phone terminal. The microphone 21 captures acoustic waves of transmission voices and surrounding voices, converts the acoustic waves into analog audio signals, and transmits the analog audio signals to an audio input unit 22.

The audio input unit 22 converts an analog audio signal supplied from the microphone 21 into a digital audio signal. The digital audio data is transmitted through the data line to the control unit 10.

The loudspeaker 27 is provided in the casing of the cellular phone terminal. The loudspeaker 27 is capable of outputting, for example, ringers (ringtones), alarm sounds, various warning tones, playback music, video sounds, and the like. The loudspeaker 27 is connected to a main audio output part 24 of the audio output unit 23. When an audio signal of a ringer, an alarm sound, music, or the like is supplied from the main audio output part 24 to the loudspeaker 27, the loudspeaker 27 converts the audio signal into acoustic waves and outputs the acoustic waves to the outside.

A receiver 28 is a receiving loudspeaker provided in the casing of the cellular phone terminal. The receiver 28 is connected to the main audio output part 24 of the audio output unit 23. When a received audio signal is supplied from the main audio output part 24 to the receiver 28, the receiver 28 converts the received audio signal into acoustic waves, and outputs the acoustic waves to the outside.

The audio output unit 23 includes the main audio output part 24 and a sub-audio output part 25.

The main audio output part 24 is connected to the loudspeaker 27, the receiver 28, and the main headphone connector 26. The main audio output part 24 is provided for performing an audio output process for outputting audio signals of ringers, alarm sounds, playback music, videos, and the like and outputting received audio signals for voice calls. The main audio output part 24 outputs audio signals of ringers, alarm sounds, playback music, videos, and the like to the loudspeaker 27 or the main headphone connector 26. The main audio output part 24 outputs received audio signals for voice calls to the receiver 28. In the cellular phone terminal according to this embodiment, only in a case where a headphone is connected to the main headphone connector 26 and, for example, a mode in which sounds are output to the headphone is set, the main audio output part 24 outputs audio signals of ringers, alarm sounds, playback music, video sounds, received sounds for voice calls, and the like to the main headphone connector 26.

The main headphone connector 26 is a terminal to which a normal headphone only having a headphone function or a so-called "headset" having both the functions of a microphone and a headphone can be connected. In this embodiment, for example, only one main headphone connector 26 is provided. When a headset is connected to the main headphone connector 26, the main headphone connector 26 outputs an analog audio signal received through the microphone function of the headset to the audio input unit 22, and outputs, through the headphone function of the headset, an audio signal supplied from the main audio output part 24 of the audio output unit 23. In a case where a headset is used, for example, for a hands-free call, an audio signal transmitted through the microphone function of the headset to the audio input unit 22 is a transmission audio signal, and an audio signal output through the headphone function of the headset is a reception audio signal.

The sub-audio output part 25 is connected to the sub-headphone connector 29.

The sub-headphone connector 29 is a terminal to which a normal headphone only having a headphone function can be connected. In this embodiment, a plurality of sub-headphone connectors 29 are provided. Thus, a plurality of headphones can be connected to the cellular phone terminal according to this embodiment.

In a case where playing back of music or viewing and listing to videos is performed in the cellular phone terminal according to this embodiment and headphones are connected to the plurality of sub-headphone connectors 29, the sub-audio output part 25 of the audio output unit 23 outputs, to the respective sub-headphone connectors 29, the same audio signals of music or videos as those output from the main audio output part 24.

The details of audio output control performed in the main audio output part 24 and the sub-audio output part 25 of the audio output unit 23 will be described later.

The memory unit 15 includes a read-only memory (ROM) and a random-access memory (RAM). The ROM includes a rewritable storage medium such as a NAND-type flash memory. For example, a program for an operating system (OS) or the like, an audio output control program according to an embodiment of the present invention, and various application programs, such as an image display control program, a navigation program for performing measurement of the current position using GPS data, route search using map data and route chart data, or the like, a schedule management program (a so-called "scheduler"), and a telephone directory (address book) management program, are stored in the ROM. In addition, various initial set values necessary for operations of the cellular phone terminal according to this embodiment, font data, various dictionary data, map data, route chart data of public transport or the like, timetable data, device type name information, terminal identification information, various set values and data used by an audio output control program according to an embodiment of the present invention, various set values and data used by other application programs are stored in the ROM. The RAM is provided as a work area in which various data are temporarily stored when the control unit 10 performs various application programs. Furthermore, the memory unit 15 may include a removable external memory card or small-sized hard disk drive.

The control unit 10 performs control of various operations, arithmetic operations, and the like in the cellular phone terminal according to this embodiment, such as control of communication in the communication circuit 11, audio output control in the audio output unit 23, image processing, and memory management. In particular, in this embodiment, the control unit 10 performs the audio output control described later by starting and executing an audio output control program according to an embodiment of the present invention stored in the memory unit 15 and other programs associated with the audio output control program.

Although not illustrated in FIG. 1, the cellular phone terminal according to this embodiment includes various component parts to be provided in general cellular phone terminals, for example, light-emitting diodes (LEDs) for a key illumination light, an incoming call light, and a photography help light, a driving unit for the LEDs, a power management IC unit for controlling a battery which supplies power to individual units and the power, a camera function unit, an acceleration sensor, an azimuth sensor, a slot for an external memory, and the like.

Figure 2:
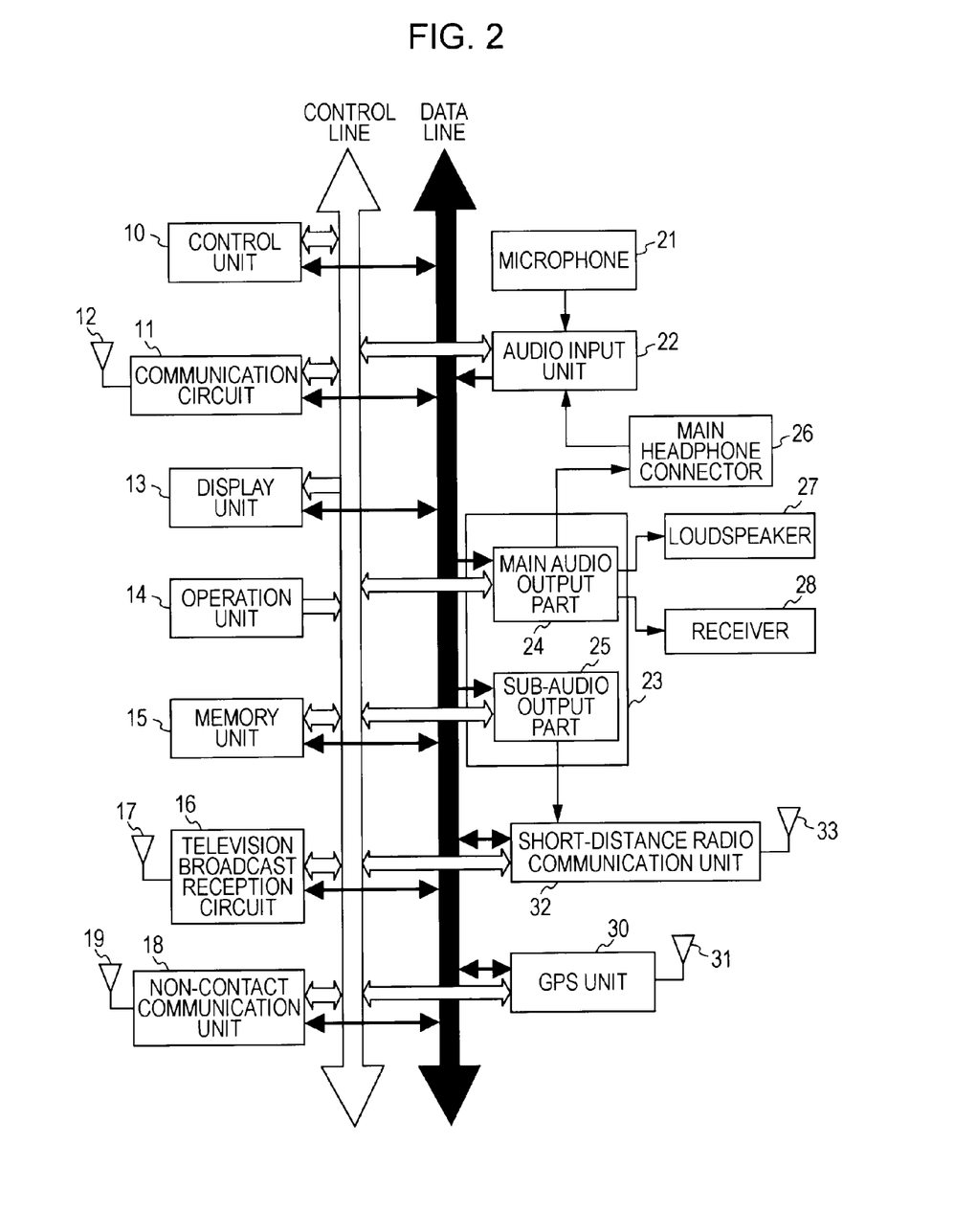
FIG. 2 is a block diagram schematically showing the internal circuit configuration of a cellular phone terminal according to a second embodiment of the present invention.

Schematic Internal Configuration of Cellular Phone Terminal According to Second Embodiment FIG. 2 schematically shows the internal configuration of a cellular phone terminal according to a second embodiment of the present invention.

In the cellular phone terminal according to the second embodiment, the same component parts as those in the first embodiment shown in FIG. 1 will be denoted by the same reference numerals as those used in FIG. 1, and the explanation of those same component parts will be omitted.

The cellular phone terminal according to the second embodiment shown in FIG. 2 includes a short-distance radio communication unit 32 and a short-distance radio communication antenna 33.

The short-distance radio communication unit 32 is a communication device for performing short-distance radio communication, such as, so-called Bluetooth®, ultra-wide band (UWB), and wireless local-area network (LAN), using the short-distance radio communication antenna 33. In this embodiment, the short-distance radio communication antenna 33 may include all the communication devices for Bluetooth, UWB, and wireless LAN or may include only one or two of the communication devices for Bluetooth, UWB, and wireless LAN.

In the case of the cellular phone terminal according to the second embodiment, the sub-audio output part 25 of the audio output unit 23 is capable of outputting audio signals to the short-distance radio communication unit 32.

That is, in this embodiment, with short-distance radio communication through the short-distance radio communication unit 32 and the short-distance radio communication antenna 33, audio signals can be output in a wireless manner to a plurality of sub-headphones supporting short-distance radio communication. Since existing techniques can be used for control for performing radio communication with a plurality of headphones through short-distance radio communication and various processing techniques, the detailed explanation of the control and processing techniques will be omitted.

Figure 3:
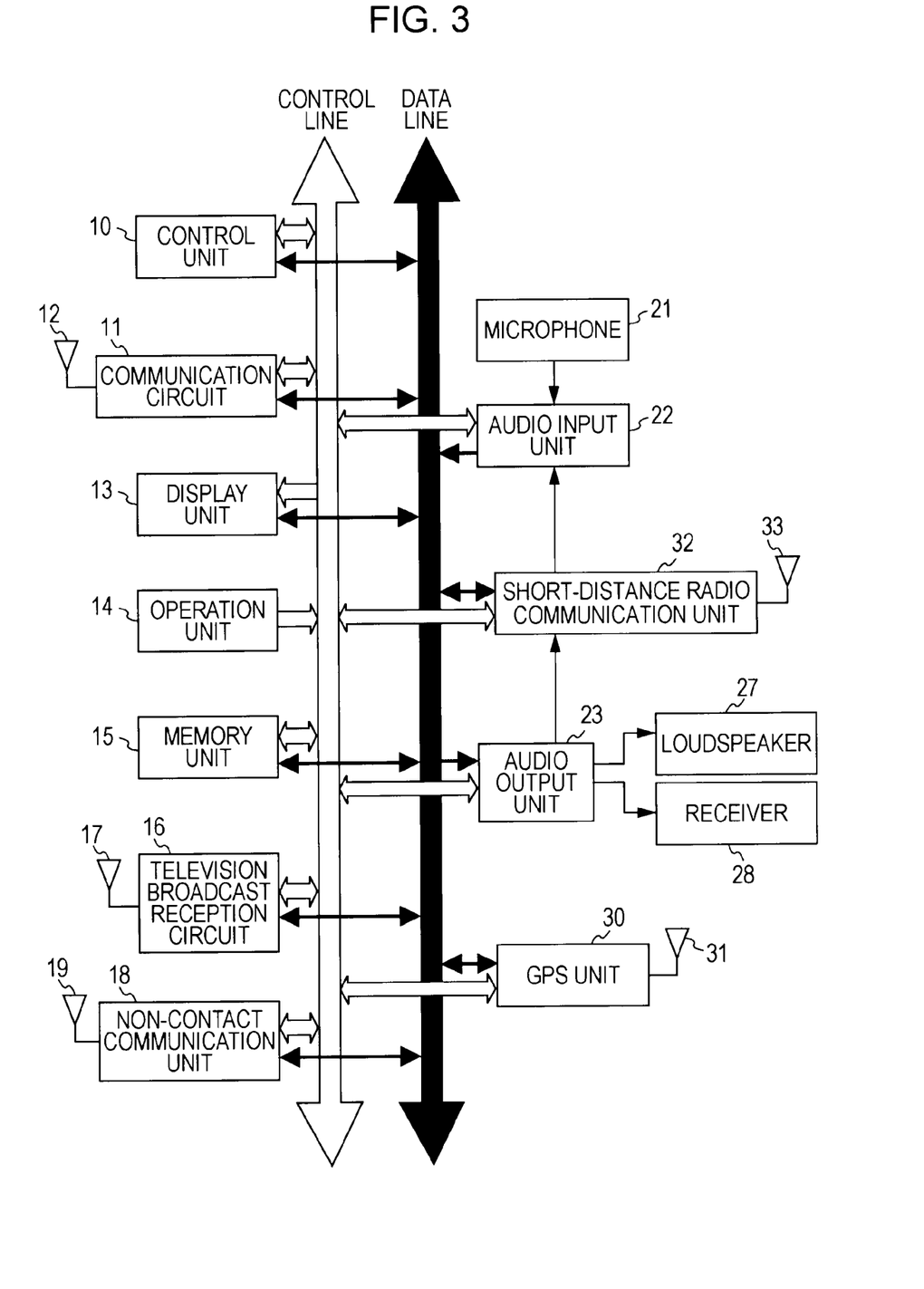
FIG. 3 is a block diagram schematically showing the internal circuit configuration of a cellular phone terminal according to a third embodiment of the present invention.

Schematic Internal Configuration of Cellular Phone Terminal According to Third Embodiment FIG. 3 schematically shows the internal configuration of a cellular phone terminal according to a third embodiment of the present invention.

In the cellular phone terminal according to the third embodiment, the same component parts as those in the second embodiment shown in FIG. 2 will be denoted by the same reference numerals as those used in FIG. 2, and the explanation of those same component parts will be omitted.

The cellular phone terminal according to the third embodiment shown in FIG. 3 includes the short-distance radio communication unit 32 and the short-distance radio communication antenna 33, as in the second embodiment.

However, in the third embodiment, the short-distance radio communication unit 32 is connected to the audio output unit 23 and the audio input unit 22, so that an audio signal supplied from the audio output unit 23 can be output in a wireless manner through short-distance radio communication and an audio signal received through short-distance radio communication can be output to the audio input unit 22.

Furthermore, in the third embodiment, the short-distance radio communication unit 32 is capable of at least transmitting audio signals to a main headphone and a plurality of sub-headphones supporting short-distance radio communication.

That is, in the third embodiment, when an audio signal of playback music, a video sound, a ringer, an alarm sound, a received voice of a voice call, or the like is supplied from the main audio output part 24 of the audio output unit 23, the short-distance radio communication unit 32 is capable of outputting the audio signal to a main headphone in a wireless manner. In addition, as in the second embodiment, the short-distance radio communication unit 32 is capable of outputting in a wireless manner, to a plurality of sub-headphones, the above-described audio signal supplied from the sub-audio output part 25.

Specific Examples of Audio Output Control Performed in Cellular Phone Terminal According to Embodiment of Present Invention Specific examples of audio output control performed when the cellular phone terminal according to the first, second, or third embodiment of the present invention outputs audio signals to a main headphone and a sub-headphone will now be explained.

A cellular phone terminal according to an embodiment of the present invention is capable of being connected to a main headphone and a sub-headphone through connectors or through short-distance radio communication and is capable of outputting audio signals of music or video sounds to the plurality of headphones, as described above. In an embodiment of the present invention, a "main headphone" is, for example, a particular headphone specified in advance to be used by a user of the cellular phone terminal, and a "sub-headphone" is a headphone to be used by a person who is different from the user of the cellular phone terminal (headphone not specified in advance).

Figure 4:
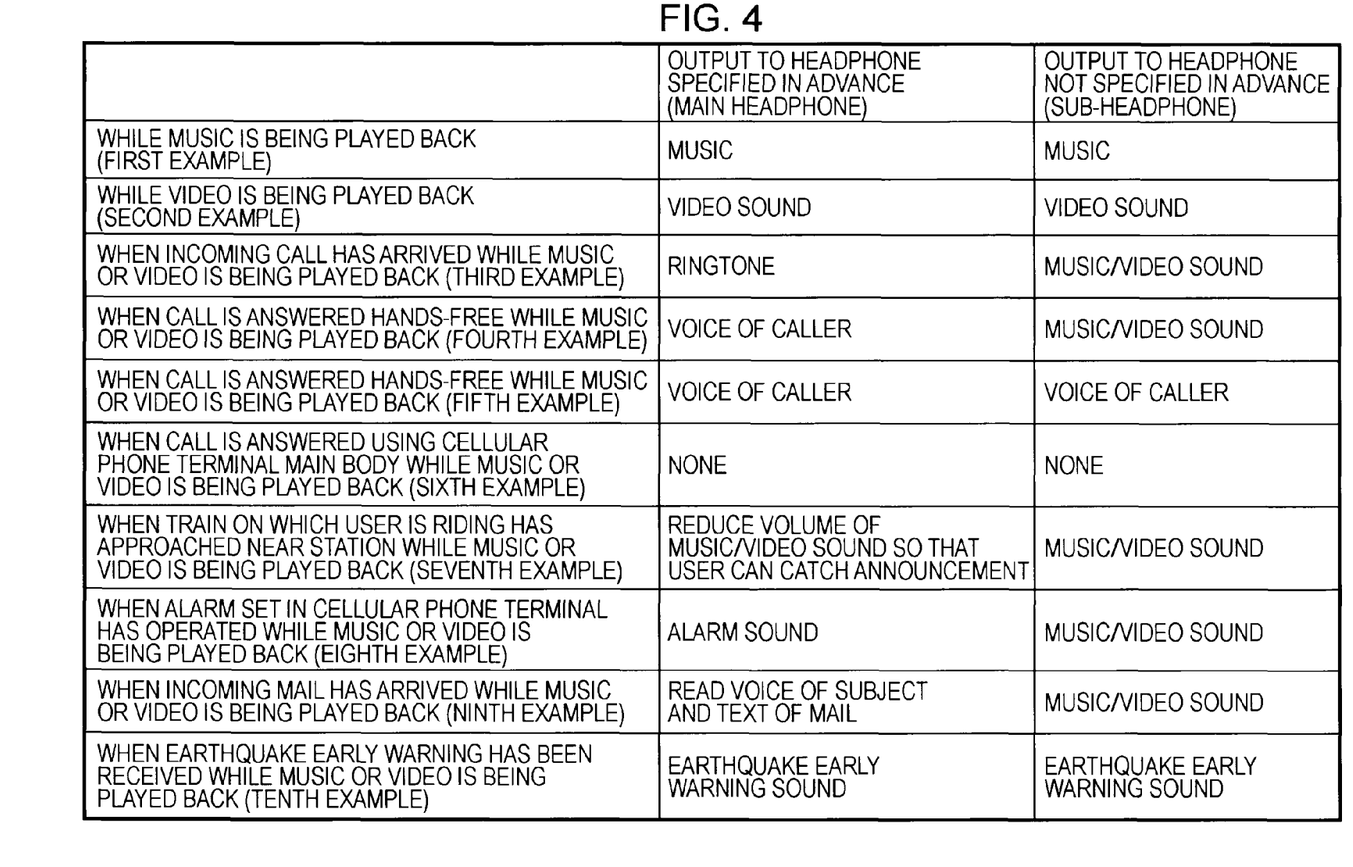
FIG. 4 is a table illustrating specific examples of audio output control performed in a cellular phone terminal according to an embodiment of the present invention.

In a case where, for example, a predetermined event, such as arrival of an incoming voice call, arrival of an incoming mail, or a situation in which alarm sound output conditions are satisfied, has occurred while a plurality of people are listening to music or video sounds using headphones, a cellular phone terminal according to an embodiment of the present invention controls audio output to the respective headphones, as shown in FIG. 4. Note that FIG. 4 shows merely examples and the present invention is also applicable to cases that are different from the examples shown in FIG. 4.

As a first example, in a case where, for example, a predetermined event, such as arrival of an incoming call, has not occurred while a cellular phone terminal according to an embodiment of the present invention is playing back music, the cellular phone terminal outputs playback music signals to a main headphone and a sub-headphone.

As a second example, in a case where, for example, a predetermined event, such as arrival of an incoming call, has not occurred while a plurality of people are listening to video sounds using a cellular phone terminal according to an embodiment of the present invention, the cellular phone terminal outputs video audio signals to a main headphone and a sub-headphone.

As a third example, in a case where, for example, an event, such as arrival of an incoming call, has occurred while music or a video is being played back as in the first or second example described above, a cellular phone terminal according to an embodiment of the present invention performs control for at least reducing the volume of music or video sounds for a main headphone and for outputting a signal of a ringtone to the main headphone. In an embodiment of the present invention, the control for reducing the volume of music or video sounds includes control for reducing the volume to zero, that is, control for stopping music or video sounds. Here, an audio signal of the music or video is continued to be output to a sub-headphone. In a case where viewing and listening to a video is being performed, displaying of the notification of an event such as arrival of an incoming call is not performed. Therefore, in the third example, only the user of the cellular phone terminal using the main headphone is able to realize the arrival of an incoming call or the like, whereas the user of the sub-headphone is able to continue to listen to the music or video sounds, and the arrival of the incoming call or the like does not prevent the user of the sub-headphone from listening to the music or video sounds.

As a fourth example, in a case where, for example, an event, that is, arrival of an incoming voice call, has occurred while music or a video is being played back and a user of a cellular phone terminal according to an embodiment of the present invention answers the voice call hands-free, the cellular phone terminal reduces the volume of music or video sounds (or stops audio output) for a main headphone and outputs the voice of a caller to the main headphone. At the same time, an audio signal of the music or video is continued to be output to a sub-headphone. Therefore, in the fourth example, the user of the cellular phone terminal using the main headphone is able to answer the voice call, whereas the user of the sub-headphone is able to continue to listen to the music or the like, and answering the voice call does not prevent the user of the sub-headphone from listening to the music or the like.

As a fifth example, in a case where, for example, an event, that is, arrival of an incoming voice call, has occurred while music or a video is being played back and a user of a cellular phone terminal according to an embodiment of the present invention answers the voice call hands-free, the cellular phone terminal may reduce the volume of music or video sounds (or stop audio output) and output the voice of a caller to a sub-headphone as well as a main headphone. Such audio output control is performed when, for example, the user of the cellular phone terminal permits the user of the sub-headphone to listen to the voice of the caller and the user of the cellular phone terminal performs a predetermined operation for allowing the user of the sub-headphone to listen to the voice of the caller. Therefore, in the fifth example, the user of the cellular phone terminal using the main headphone is able to answer the voice call, and the user of the sub-headphone is able to listen to the response to the voice call.

As a sixth example, in a case where, for example, an event, that is, arrival of an incoming voice call, has occurred while music or a video is being played back and a user of a cellular phone terminal according to an embodiment of the present invention answers the voice call using the microphone 21 and the receiver 28 of the cellular phone terminal main body, the cellular phone terminal reduces the volume of music or video sounds to zero (stops audio output) for a main headphone and a sub-headphone. Therefore, in the sixth example, the user of the cellular phone terminal using the main headphone is able to answer the voice call using the microphone 21 and the receiver 28 of the cellular phone terminal main body.

As a seventh example, in a case where, for example, a predetermined event, that is, approach of a train on which a user of a cellular phone terminal according to an embodiment of the present invention is riding to a near station, has occurred while music or a video is being played back, the cellular phone terminal reduces the volume of music or video sounds (or stops audio output) for a main headphone so that the user of the cellular phone terminal can easily catch an on-train announcement. Meanwhile, a music or video audio signal is continued to be output to a sub-headphone. In the seventh example, the cellular phone terminal detects the occurrence of the predetermined event, for example, after the user enters a station using a commuter pass for non-contact communication, when approach to a near station within the commuter pass area is detected by comparison between current position information detected by the GPS unit 30 with a map or route chart information. Furthermore, the determination of whether or not the train has approached a near station may be performed, for example, by acquisition of station information transmitted from a short-distance radio communication device provided in a vehicle of the train. In addition, a near station is not necessarily a station where the user gets off within the commuter pass area. A near station may be any station set in advance. Furthermore, when the train has approached a near station, an audio signal notifying that the train has approached the near station may be output to the main headphone. Therefore, in the seventh example, the user of the cellular phone terminal using the main headphone is able to reliably realize that the train has approached a near station, whereas the user of the sub-headphone is able to continue to listen to the music or the like.

As an eighth example, in a case where, for example, a predetermined event that satisfies alarm occurrence conditions, such as arrival of a year, month, date, or time set in advance or arrival to a place set in advance, has occurred while music or a video is being played back, a cellular phone terminal according to an embodiment of the present invention reduces the volume of music or video sounds (or stops audio output) for a main headphone and outputs an alarm sound to the main headphone. Meanwhile, a music or video audio signal is continued to be output to a sub-headphone. The determination of whether or not a time or the like set in advance has been reached can be performed on the basis of the time based on a clock function provided in the cellular phone terminal. The determination of whether or not the user has reached a place set in advance can be performed on the basis of position detection information supplied from the GPS unit 30 provided in the cellular phone terminal. Therefore, in the eighth example, the user of the cellular phone terminal using the main head phone is able to reliably realize that the time or the like set in advance has been reached or that the user has reached the desired place set in advance, whereas the user of the sub-headphone is able to continue to listen to the music or the like.

As a ninth example, in a case where, for example, an event, that is, arrival of an incoming mail, has occurred while music or a video is being played back and a user of a cellular phone terminal according to an embodiment of the present invention issues an instruction to read out the subject or text of the incoming mail using a so-called "text-speech conversion process", the cellular phone terminal reduces the volume of music or video sounds (or stops audio output) for a main headphone and outputs the read voice to the main headphone. Meanwhile, a music or video audio signal is continued to be output to a sub-headphone. Since the text-speech conversion process is an existing technique, the detailed explanation of the text-speech conversion process will be omitted. In addition, it is desirable that in a case where viewing and listening to a video is being performed, displaying of a received mail be not performed and only the read voice be output to the main headphone. Therefore, in the ninth example, the user of the cellular phone terminal using the main headphone is able to check the details of the received electronic mail, whereas the user of the sub-headphone is able to continue to listen to the music or the like.

As a tenth example, in a case where, for example, a predetermined event, that is, reception of a so-called "earthquake early warning" through a television broadcast or the like, has occurred while music or a video is being played back, a cellular phone terminal according to an embodiment of the present invention reduces the volume of music or video sounds to zero (that is, stops audio output) and outputs sounds of the earthquake early warning to both a main headphone and a sub-headphone. Therefore, in the tenth example, both the user of the cellular phone terminal using the main headphone and the user of the sub-headphone are able to quickly catch the announcement of the earthquake early warning and are thus able to take appropriate actions with respect to the earthquake. For the notification of urgent information as in the tenth example, it is desirable that indication on the screen as well as sound be provided. It is desirable, for example, even when viewing and listening to a video is being performed, displaying of the video be stopped and urgent information be displayed.

Furthermore, only a single main headphone is defined as a particular external headphone and all the other headphones are defined as sub-headphones in an embodiment of the present invention. However, for example, desired one or more of the sub-headphones may be defined as particular external headphones.

In addition, the determination of which one of output control operations for an audio signal is to be performed for a predetermined event in the individual examples shown in FIG. 4 may be individually set in advance.

Figure 5:
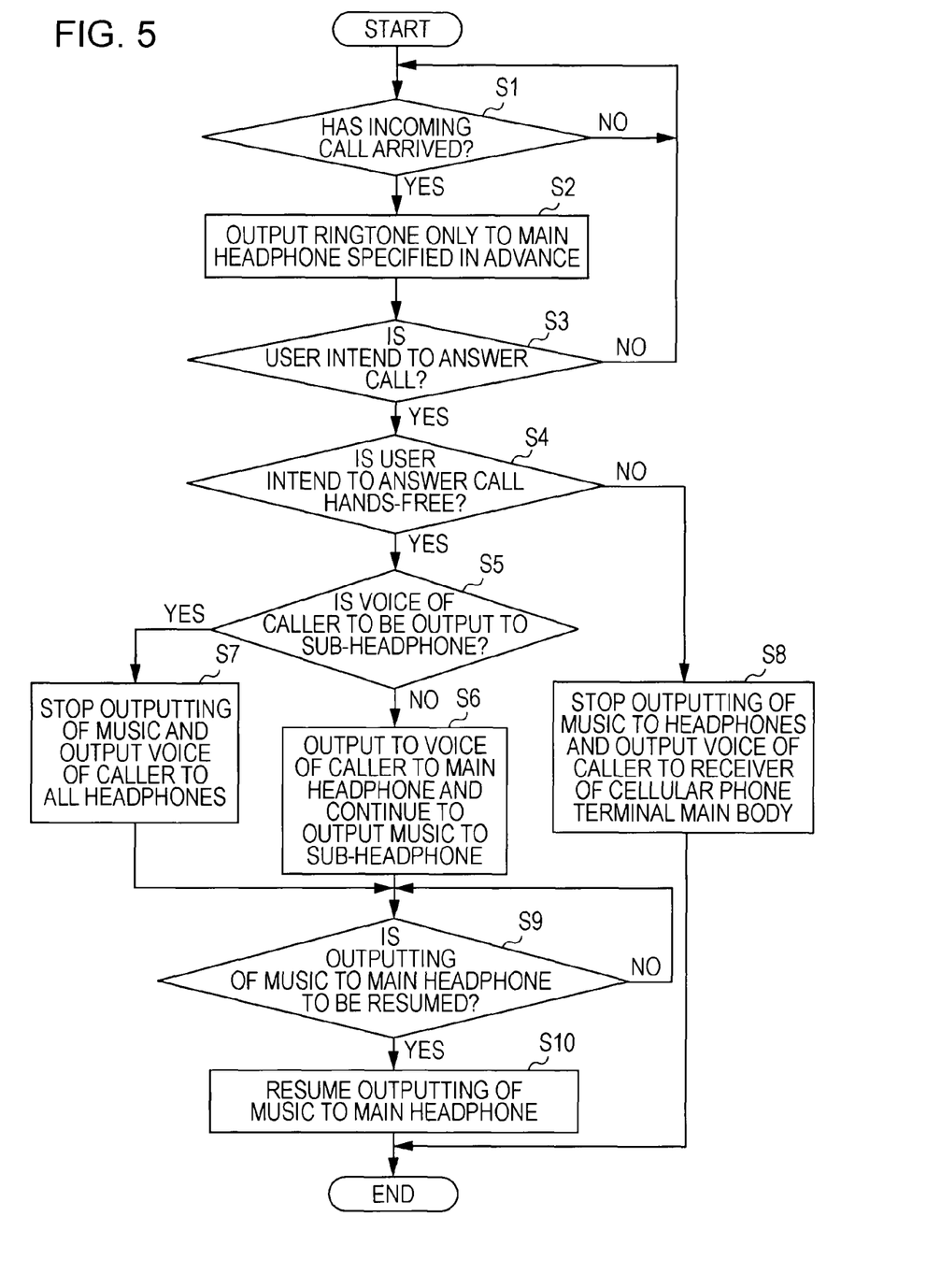
FIG. 5 is a flowchart showing, as an example of audio output control performed in a cellular phone terminal according to an embodiment of the present invention, a process performed in a case where an event, that is, arrival of an incoming voice call, has occurred while music is being played back.

Flowcharts of Audio Output Control Performed in Cellular Phone Terminal According to Embodiment of Present Invention FIG. 5 is a flowchart showing, as an example of audio output control performed in a cellular phone terminal according to an embodiment of the present invention, a process performed in a case where, for example, an event, that is, arrival of an incoming voice call, has occurred while music is being played back. The flowchart shown in FIG. 5 and flowcharts shown in FIGS. 6 to 8, which will be described later, show processes performed when the control unit 10 of the cellular phone terminal executes an audio output control program according to an embodiment of the present invention.

When an audio output control program according to an embodiment of the present invention starts, in a case where, for example, music is being played back and music signals are being output to a main headphone and a sub-headphone, the control unit 10 is capable of performing the process shown in the flowchart of FIG. 5.

Referring to the flowchart of FIG. 5, in step S1, the control unit 10 monitors whether or not an event, that is, arrival of an incoming voice call, has occurred. In a case where a voice call has arrived, the control unit 10 proceeds to step S2.

In step S2, the control unit 10 controls the main audio output part 24 of the audio output unit 23 to reduce (for example, stop) the output level of an audio signal of the music for the main headphone specified in advance and output a ringtone to the main headphone. Furthermore, the control unit 10 controls the sub-audio output part 25 to continue to output an audio signal of the music to the sub-headphone. In a case where playing back of only music is being performed as in this example, displaying of the notification of the arrival of an incoming voice call may be performed on the screen in step S2. However, in a case where, for example, viewing and listening to a video or the like is being performed, displaying of the notification of the arrival of an incoming voice call is not performed.

In step S3, the control unit 10 determines whether or not the user of the cellular phone terminal has performed an operation for answering the voice call by using, for example, the operation unit 14 or an operation unit provided in the main headphone. In a case where an operation for answering the voice call has been performed, the control unit 10 proceeds to step S4. Meanwhile, in a case where an operation for answering the voice call has not been performed, the control unit 10 returns to step S1.

In step S4, the control unit 10 determines whether or not an instruction to answer the voice call hands-free using the main headphone has been issued from the user of the cellular phone terminal. The determination of whether or not to answer the voice call hands-free is performed in accordance with, for example, whether or not an operation using the operation unit 14, an operation using a predetermined operation unit provided in the main headphone, or a preset for automatically answering a call hands-free when the main headphone is used has been performed. In a case where the voice call is to be answered hands-free, the control unit 10 proceeds to step S5. Meanwhile, in a case where the call is not to be answered hands-free, the control unit 10 proceeds to step S8.

In step S5, the control unit 10 determines whether or not a setting for outputting the voice of a caller also to the sub-headphone has been performed. The determination of whether or not to output the voice of a caller also to the sub-headphone is performed in accordance with, for example, whether or not an operation using the operation unit 14 or a preset for automatically outputting the voice of a caller also to the sub-headphone when the sub-headphone is used has been performed. In a case where the voice of a caller is not to be output to the sub-headphone, the control unit 10 proceeds to step S6. Meanwhile, in a case where the voice of a caller is to be output also to the sub-headphone, the control unit 10 proceeds to step S7.

In step S6, the control unit 10 controls the main audio output part 24 of the audio output unit 23 to reduce (for example, stop) the output level of the music for the main headphone and output the voice of the caller to the main headphone. Furthermore, the control unit 10 controls the sub-audio output part 25 to continue to output an audio signal of the music to the sub-headphone. After the processing of step S6, the control unit 10 proceeds to step S9.

In step S7, the control unit 10 controls the main audio output part 24 of the audio output unit 23 to reduce the output level of an audio signal of the music (for example, stop audio output) for the main headphone and output the voice of the caller to the main headphone. Similarly, the control unit 10 controls the sub-audio output part 25 to reduce the output level of an audio signal of the music (for example, stop audio output) for the sub-headphone and output the voice of the caller to the sub-headphone. After the processing of step S7, the control unit 10 proceeds to step S9.

In step S9, after the call ends, the control unit 10 determines whether or not outputting of music to the main headphone is to be resumed. The determination of whether or not to resume the outputting of music to the main headphone is performed in accordance with, for example, whether or not an operation using the operation unit 14 or an operation using a predetermined operation unit provided in the main-headphone has been performed. In a case where outputting of music to the main headphone is to be resumed, the control unit 10 proceeds to step S10. Meanwhile, in a case where outputting of music to the main headphone is not to be resumed, the control unit 10 continues to perform the determination of step S9.

In step S10, the control unit 10 controls the main audio output part 24 of the audio output unit 23 to resume the outputting of music to the main headphone.

In a case where outputting of music to the sub-headphone is stopped in step S7, the determination of whether or not to resume the outputting of music to the sub-headphone is also performed in step S9. The determination of whether or not to resume the outputting of music to the sub-headphone is performed in accordance with, for example, whether or not an operation using the operation unit 14 has been performed. In a case where outputting of music to the sub-headphone is to be resumed, outputting of music to the sub-headphone is resumed in step S10.

Meanwhile, in a case where it is determined in step S4 that the voice call is not to be answered hands-free and the control unit 10 proceeds to step S8, the control unit 10 controls the main audio output part 24 and the sub-audio output part 25 of the audio output unit 23 to reduce the output level of the music (for example, stop audio output) for the main headphone and the sub-headphone. Then, the control unit 10 controls the main audio output part 24 to allow the call to be answered using the microphone 21 and the receiver 28 of the cellular phone terminal main body.

In this embodiment, in step S8, outputting of music to the main headphone and the sub-headphone is stopped. However, as in the processing of steps S9 and S10, after the call ends, outputting of music to the main headphone and the sub-headphone may be resumed.

Figure 6:
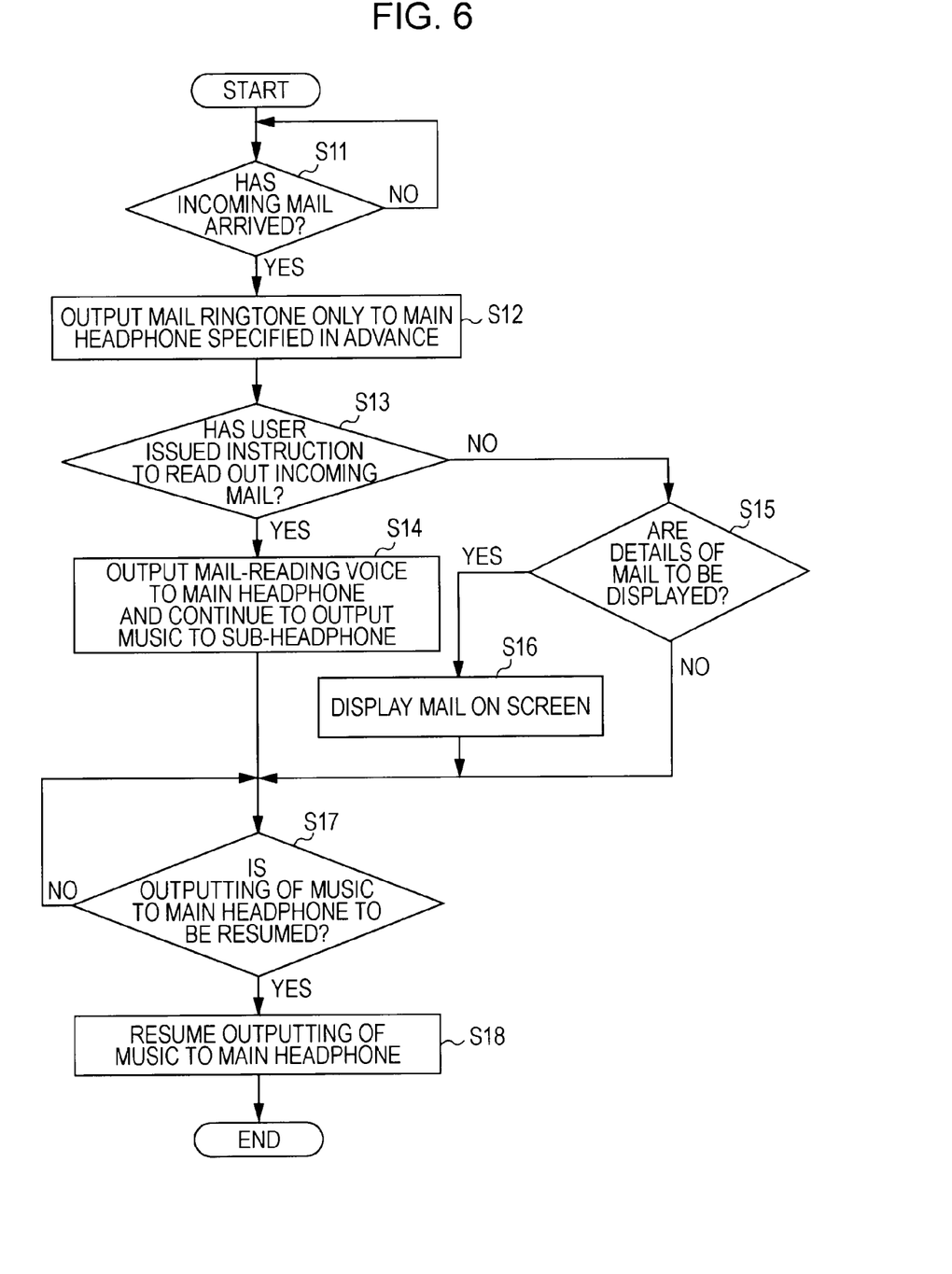
FIG. 6 is a flowchart showing, as an example of audio output control performed in a cellular phone terminal according to an embodiment of the present invention, a process performed in a case where an event, that is, arrival of an incoming mail, has occurred while music is being played back.

FIG. 6 is a flowchart showing, as an example of audio output control performed in a cellular phone terminal according to an embodiment of the present invention, a process performed in a case where, for example, an event, that is, arrival of an incoming mail, has occurred while music is being played back.

When an audio output control program according to an embodiment of the present invention starts, in a case where, for example, music is being played back and music signals are being output to a main headphone and a sub-headphone, the control unit 10 is capable of performing the process shown in the flowchart of FIG. 6.

Referring to the flowchart of FIG. 6, in step S11, the control unit 10 monitors whether or not an event, that is, arrival of an incoming mail, has occurred. In a case where an incoming mail has arrived, the control unit 10 proceeds to step S12.

In step S12, the control unit 10 controls the main audio output part 24 of the audio output unit 23 to reduce (for example, stop) the output level of the music for the main headphone specified in advance and output a mail ringtone to the main headphone. Furthermore, the control unit 10 controls the sub-audio output part 25 to continue to output the music to the sub-headphone. In a case where playing back of only music is being performed as in this example, displaying of the notification of the arrival of an electronic mail may be performed on the screen in step S12. However, in a case where, for example, viewing and listening to a video or the like is being performed, displaying of the notification of the arrival of an electronic mail is not performed.

In step S13, the control unit 10 monitors whether or not an operation for issuing an instruction to read out the details of the electronic mail has been performed by the user of the cellular phone terminal by using, for example, the operation unit 14. In a case where an operation for issuing an instruction to read out the details of the electronic mail has been performed, the control unit 10 proceeds to step S14. Meanwhile, in a case where an operation for issuing an instruction to read out the details of the electronic mail has not been performed, the control unit 10 proceeds to step S15.

In step S14, the control unit 10 performs a text-speech conversion process, and controls the main audio output part 24 of the audio output unit 23 to output mail-reading voice, which is generated by the text-speech conversion process, via the main headphone. Furthermore, the control unit 10 controls the sub-audio output part 25 to continue to output the music to the sub-headphone. After the processing of step S14, the control unit 10 proceeds to step S17. In a case where, for example, an explicit instruction to output the mail-reading voice also to the sub-headphone has been issued from the user of the cellular phone terminal, outputting of a music signal to the sub-headphone may be stopped and a signal of the mail-reading voice may be output to the sub-headphone.

In step S15, the control unit 10 determines whether or not the details of the received mail are to be displayed on the screen. The determination of whether or not to display the details of the mail is performed in accordance with, for example, whether or not an instruction to display the details of the mail has been issued from the user of the cellular phone terminal by using the operation unit 14. In a case where an instruction to display the details of the mail has been issued, the control unit 10 proceeds to step S16. Meanwhile, in a case where an instruction to display the details of the mail has not been issued, the control unit 10 proceeds to step S17.

In step S16, the control unit 10 displays the details of the mail on the screen. Then, the control unit 10 proceeds to step S17.

In step S17, the control unit 10 determines whether or not outputting of music to the main headphone is to be resumed. The determination of whether or not to resume the outputting of music to the main headphone is performed in accordance with, for example, whether or not an operation using the operation unit 14 or an operation using a predetermined operation unit provided in the main headphone has been performed. In a case where outputting of music to the main headphone is to be resumed, the control unit 10 proceeds to step S18. Meanwhile, in a case where outputting of music to the main headphone is not to be resumed, the control unit 10 continues to perform the determination of step S17.

In step S18, the control unit 10 controls the main audio output part 24 of the audio output unit 23 to resume the outputting of music to the main headphone.

In a case where outputting of music to the sub-headphone is stopped since the mail-reading voice is also output to the sub-headphone, the determination of whether or not to resume the outputting of music to the sub-headphone is also performed in step S17. The determination of whether or not to resume the outputting of music to the sub-headphone is performed in accordance with, for example, whether or not an operation using the operation unit 14 has been performed. In a case where outputting of music to the sub-headphone is to be resumed, outputting of music to the sub-headphone is resumed in step S18.

Figure 7:
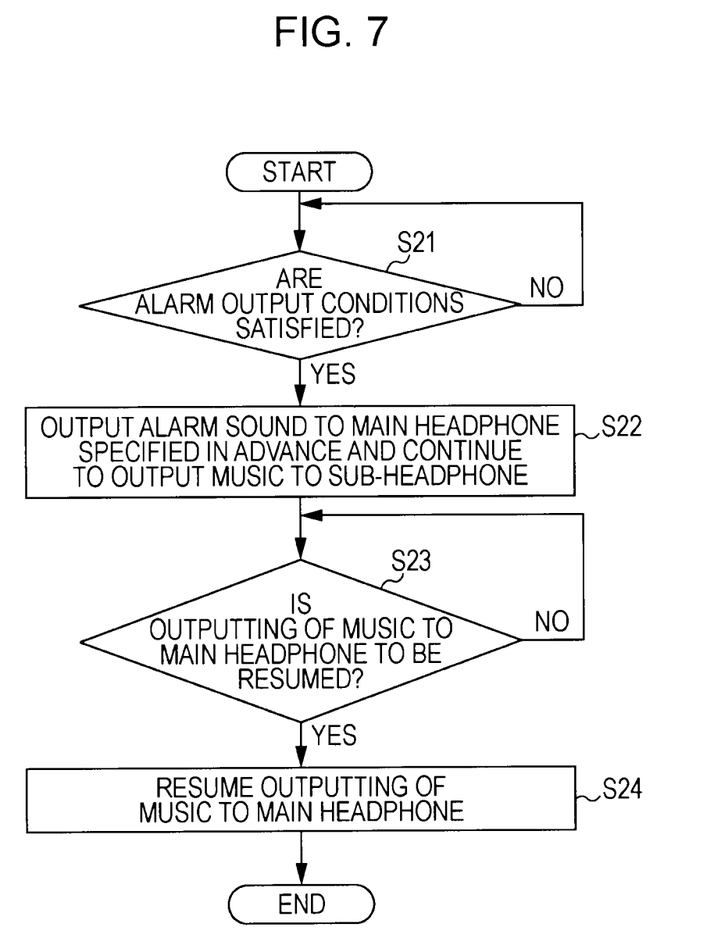
FIG. 7 is a flowchart showing, as an example of audio output control performed in a cellular phone terminal according to an embodiment of the present invention, a process performed in a case where an event that satisfies alarm sound output conditions set in advance has occurred while music is being played back.

FIG. 7 is a flowchart showing, as an example of audio output control performed in a cellular phone terminal according to an embodiment of the present invention, a process performed in a case where, for example, an event that satisfies alarm sound output conditions set in advance has occurred while music is being played back.

When an audio output control program according to an embodiment of the present invention starts, in a case where, for example, music is being played back and music signals are being output to a main headphone and a sub-headphone, the control unit 10 is capable of performing the process of the flowchart shown in FIG. 7.

Referring to the flowchart of FIG. 7, in step S21, the control unit 10 monitors whether or not alarm sound output conditions set in advance are satisfied. In a case where an event that satisfies the alarm sound output conditions has occurred, the control unit 10 proceeds to step S22.

In step S22, the control unit 10 controls the main audio output part 24 of the audio output unit 23 to reduce (stop) the output level of the music for the main headphone and output an alarm sound to the main headphone. Meanwhile, the control unit 10 controls the sub-audio output part 25 to continue to output the music to the sub-headphone. In a case where, for example, an explicit setting for outputting an alarm sound also to the sub-headphone has been performed in advance by the user of the cellular phone terminal, outputting of a music signal to the sub-headphone may be stopped and the alarm sound may be output to the sub-headphone.

In step S23, the control unit 10 determines whether or not outputting of music to the main headphone is to be resumed. The determination of whether or not to resume the outputting of music to the main headphone is performed in accordance with, for example, whether or not an operation using the operation unit 14 or an operation using a predetermined operation unit provided in the main headphone has been performed. In a case where outputting of music to the main headphone is to be resumed, the control unit 10 proceeds to step S24. Meanwhile, in a case where outputting of music to the main headphone is not to be resumed, the control unit 10 continues to perform the determination of step S23.

In step S24, the control unit 10 controls the main audio output part 24 of the audio output unit 23 to resume the outputting of music to the main headphone.

In a case where outputting of music to the sub-headphone is stopped since the alarm sound is also output to the sub-headphone, the determination of whether or not to resume the outputting of music to the sub-headphone is also performed in step S23. The determination of whether or not to resume the outputting of music to the sub-headphone is performed in accordance with, for example, whether or not an operation using the operation unit 14 has been performed. In a case where outputting of music to the sub-headphone is to be resumed, outputting of music to the sub-headphone is resumed in step S24.

Figure 8:
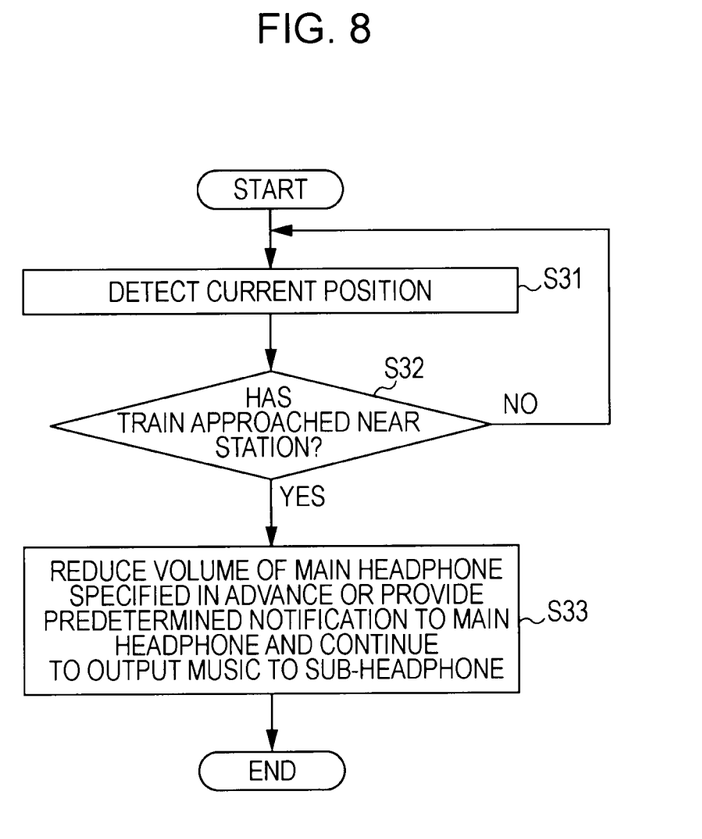
FIG. 8 is a flowchart showing, as an example of audio output control performed in a cellular phone terminal according to an embodiment of the present invention, a process performed in a case where an event, that is, approach of a train on which a user of the cellular phone terminal is riding to a near station, has occurred while music is being played back.

FIG. 8 is a flowchart showing, as an example of audio output control performed in a cellular phone terminal according to an embodiment of the present invention, a process performed in a case where, for example, an event, that is, approach of a train on which a user of the cellular phone terminal is riding to a near station, has occurred while music is being played back.

When an audio output control program according to an embodiment of the present invention starts, in a case where, for example, after the user enters a station using non-contact communication, music is being played back while the user is on a train or the like and music signals are being output to a main headphone and a sub-headphone, the control unit 10 is capable of performing the process of the flowchart shown in FIG. 8.

Referring to the flowchart of FIG. 8, in step S31, the control unit 10 detects the current position by position measurement using, for example, the GPS unit 30.

In step S32, the control unit 10 determines whether or not the train has approached a near station, in accordance with current position information supplied from the GPS unit 30 and map data and route chart data stored in the memory unit 15. The control unit 10 may determine whether or not the train has approached the near station in accordance with station information acquired through short-distance radio communication from a short-distance radio communication device provided in a vehicle of the train. In a case where it is determined that the train has approached the near station, the control unit 10 proceeds to step S33. Meanwhile, in a case where it is determined that the train has not approached the near station, the control unit 10 returns to step S31.

In step S33, the control unit 10 controls the main audio output part 24 of the audio output unit 23 to reduce the output volume of the music for the main headphone so that the user can easily catch an on-train announcement or to output a predetermined notification voice for announcing that the train has approached the near station. Meanwhile, the control unit 10 controls the sub-audio output part 25 to continue to output the music to the sub-headphone. In a case where, for example, an explicit setting for reducing the audio output volume for the sub-headphone when the train has approached a near station has been performed in advance by the user of the cellular phone terminal, the output volume of a music signal may be reduced for the sub-headphone so that the user of the sub-headphone can easily catch an on-train announcement or the like.

In the example of FIG. 8, since it is considered that individual users get off the train after the train has arrived at the near station, outputting of music is not resumed. However, obviously, outputting of music may be resumed.

CONCLUSION

As explained above, according to an embodiment of the present invention, by appropriately controlling audio output to a plurality of external headphones when a predetermined event such as arrival of an incoming call has occurred in a cellular phone terminal that is capable of outputting audio signals to the plurality of external headphones, a situation in which a ringtone or the like prevents a plurality of users from viewing and listening to music, videos, or the like can be avoided. Furthermore, with a cellular phone terminal according to an embodiment of the present invention, in a case where, for example, a predetermined event such as arrival of an incoming call has occurred, an optimal notification can be provided to a user of the cellular phone terminal. Therefore, the user of the cellular phone terminal is able to appropriately respond to the predetermined event such as the arrival of an incoming call.

The embodiments of the present invention described above are merely examples of the present invention. The present invention is not limited to the embodiments described above. Obviously, various changes can be made to the present invention in accordance with design or the like without departing from the technical idea of the present invention.

For example, a portable terminal according to an embodiment of the present invention is not limited to a cellular phone terminal. A portable terminal according to an embodiment of the present invention may be any device, such as a personal digital assistant (PDA), a portable personal computer, a portable television game machine, a portable digital television receiver, or a portable navigation device, as long as it is capable of outputting audio signals to a plurality of external headphones and a predetermined event can occur in the device.

The present application contains subject matter related to that disclosed in Japanese Priority Patent Application JP 2008-292214 filed in the Japan Patent Office on Nov. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal comprising:
an audio output unit configured to output audio signals to a plurality of external headphones; an event occurrence detection unit configured to detect an occurrence of a predetermined event; and a control unit configured to, when the event occurrence detection unit detects the occurrence of the predetermined event while the audio output unit is outputting the audio signals to the plurality of external headphones, control the audio output unit to at least reduce the volume of each of the audio signals output to a particular external headphone of the plurality of external headphones and specified in advance in a predetermined subset smaller than audio signals output to the plurality of remaining external headphones and while each of the audio signals output to the plurality of remaining external headphones that are not included in the predetermined subset continue to be output without the same reduction in volume.

2. The portable terminal according to claim 1, wherein
the event occurrence detection unit detects arrival of an incoming voice call or electronic mail from an external communication device to the portable terminal as the occurrence of the predetermined event, and
when the event occurrence detection unit detects the occurrence of the predetermined event while the audio output unit is outputting the audio signals to the plurality of external headphones, the control unit controls the audio output unit to output a sound signal indicating the arrival of the incoming voice call or electronic mail to each of the predetermined subset of the plurality of external headphones.

3. The portable terminal according to claim 2, wherein
the event occurrence detection unit detects the arrival of an incoming voice call as the occurrence of the predetermined event, and
when a response to the incoming voice call is made using one of the predetermined subset of the plurality of external headphones, the control unit controls the audio output unit to output, to the one of the predetermined subset of the plurality of external headphones, a received audio signal of the voice call from the external communication device.

4. The portable terminal according to claim 2, wherein
the event occurrence detection unit detects the arrival of an incoming voice call as the occurrence of the predetermined event, and
when a response to the incoming voice call is made using a voice call function provided in the portable terminal, the control unit controls the audio output unit to stop outputting of the audio signals to all the plurality of external headphones.

5. The portable terminal according to claim 2, wherein
the event occurrence detection unit detects the arrival of an incoming electronic mail as the occurrence of the predetermined event, and
when a response to the electronic mail is made, the control unit controls the audio output unit to output a read voice signal, which is obtained by converting text of the electronic mail into speech, to each of the predetermined subset of the plurality of external headphones.

6. The portable terminal according to claim 1, wherein
the event occurrence detection unit detects approach of the portable terminal to a near station set in advance as the occurrence of the predetermined event.

7. The portable terminal according to claim 1, wherein
the event occurrence detection unit detects a situation in which alarm occurrence conditions set in advance are satisfied as the occurrence of the predetermined event, and
when the event occurrence detection unit detects the occurrence of the predetermined event while the audio output unit is outputting the audio signals to the plurality of external headphones, the control unit controls the audio output unit to output a predetermined alarm sound signal to each of the predetermined subset of the plurality of external headphones.

8. An audio output control method of a portable terminal, the method comprising:

outputting, audio signals to a plurality of external headphones;
detecting, an occurrence of a predetermined event; and
when the occurrence of the predetermined event is detected while the audio signals are being output to the plurality of external headphones,
at least reducing the volume of each of the audio signals output to a particular external headphone of the plurality of external headphones and specified in advance in a predetermined subset smaller than audio signals output to the plurality of remaining external headphones and while each of the audio signals output to the plurality of remaining external headphones that are not included in the predetermined subset continue to be output without the same reduction in volume.

9. A non-transitory computer-readable storage medium having an audio output control program stored therein that when executed by a computer causes the computer to perform a method of a portable terminal, the method comprising:
outputting, audio signals to a plurality of external headphones;
detecting, an occurrence of a predetermined event; and
when the occurrence of the predetermined event is detected while the audio signals are being output to the plurality of external headphones,
at least reducing the volume of each of the audio signals output to a particular external headphone of the plurality of external headphones and specified in advance in a predetermined subset smaller than audio signals output to the plurality of remaining external headphones and while each of the audio signals output to the plurality of remaining external headphones that are not included in the predetermined subset continue to be output without the same reduction in volume.

10. The portable terminal according to claim 1, wherein
the audio output unit outputs the audio signals to the plurality of external headphones that are connected to the portable terminal via one or a combination of a wired communication link and a short distance wireless radio communication.

11. The portable terminal according to claim 1, wherein
the audio output unit is configured to output the same audio content to each of the plurality of external headphones.

12. The portable terminal according to claim 1, wherein
when the predetermined subset of the plurality of external headphones includes only one of the plurality of external headphones.

13. The portable terminal according to claim 1, wherein
when the event occurrence detection unit detects the arrival of an incoming voice call as the occurrence of the predetermined event and when a response to the incoming voice call is made using one of the predetermined subset of the plurality of external headphones,
the control unit controls the audio output unit to output, to the one of the predetermined subset of the plurality of external headphones, a received audio signal of the voice call from the external communication device while each of the audio signals output to the plurality of external headphones other than the one of the predetermined subset of the plurality of external headphones continue to be output.

* * * * *